United States Patent [19]
Effenberger et al.

[11] 3,921,248
[45] Nov. 25, 1975

[54] APPARATUS FOR REMOVING EXCESS LUBRICANT FROM ANTIFRICTION BEARINGS

[75] Inventors: Rudolf Effenberger, Munchingen; Stefan Müller, Asperg; Heinz Reinhardt, Stuttgart, all of Germany

[73] Assignee: SKF Kugellagerfabriken GmbH, Schweinfurt, Germany

[22] Filed: Apr. 10, 1974

[21] Appl. No.: 459,617

[30] Foreign Application Priority Data
Apr. 19, 1973  Germany............................ 2319864

[52] U.S. Cl. ................................................ 15/304
[51] Int. Cl.² .......................................... A47L 5/38
[58] Field of Search .......... 184/1 E, 1 D, 39, 105 R; 123/196; 134/169 A; 222/389; 308/78, 187, 308/240, 237; 128/188; 15/304

[56] References Cited
UNITED STATES PATENTS

| | | | |
|---|---|---|---|
| 2,369,178 | 2/1945 | Richmond et al. ................. | 184/1 D |
| 2,427,233 | 9/1947 | Shartle............................... | 184/1 D |
| 2,514,799 | 7/1950 | Rubertino et al................... | 184/1 D |
| 3,637,272 | 1/1972 | Christiansen..................... | 308/237 R |

FOREIGN PATENTS OR APPLICATIONS

| | | | |
|---|---|---|---|
| 1,193,522 | 6/1970 | United Kingdom................. | 128/188 |

Primary Examiner—Richard J. Apley
Assistant Examiner—William R. Browne

[57] ABSTRACT

An apparatus for removing excess lubricant from antifriction bearings having an outer race member, an inner race member, a plurality of roller bodies located therebetween and a lubricant in the space between the race members. For the antifriction bearings to be treated, a receiving housing is provided having a sealed chamber for location therein of a bearing to be treated with one bearing end inside it and the other bearing end extending outwardly therefrom. A duct for pressurized gaseous media communicates with the sealed chamber to impress thereinto the pressurized gaseous media to cause same to flow axially through the bearing from one end to the other carrying with it any excess or redundant lubricant. The housing is provided with a second chamber sealingly separated by an intermediate wall from the sealed chamber and serving for receiving the expelled lubricant. A valve is provided within said duct to control and regulate the supply of the pressurized gaseous media. A top lid sealing the sealed chamber may be adapted to operate the valve.

13 Claims, 2 Drawing Figures

APPARATUS FOR REMOVING EXCESS LUBRICANT FROM ANTIFRICTION BEARINGS

BACKGROUND OF INVENTION

The present invention relates to pre-lubricated anti friction bearings and in particular to an apparatus for removing superfluous or excess lubricant therefrom.

As is well known pre-lubricated anti friction bearings are provided for many industrial applications. In such bearings a quantity of a lubricant such as grease is supplied to the space formed between the inner and outer races, in which the roller bodies such as balls are located. As is common the lubricant grease is fed by means of a pumping device into the space between the race members from one end of the bearing axially through to the opposite end. The lubricating operation is deemed to be terminated and a sufficient quantity of lubricant supplied to the bearing, when the lubricant itself emerges from the far end of the bearing. No adequate measure of the amount of lubricant forced into the bearing is made and thus in order to assure that a sufficient amount of lubricant has indeed been supplied, it is the general rule to provide an excess of the lubricant. The lubricant not only serves to insure proper running of the bearing but is also advantageous in sealing the interior of the bearing against the introduction of dirt and other impurities during its use. Furthermore, it is generally known that the amount of lubricant inserted in the bearing is more than is actually necessary to provide optimum lubrication during the running of the bearing. In addition, during the running of the bearing, the lubricant becomes warm and the excess lubricant squirts out of the axial end of the bearing tending to contaminate the equipment in which it is located and the material being worked on by the equipment. This is particularly true when the bearing is operated at extremely high speeds. It has therefore been found necessary to remove any excess lubricant from the anti friction bearing before the bearing is placed in operation.

The prior art shows a device which not only supplies the lubricant to the anti friction bearing but also removes excess lubricant therefrom. This device is constructed in such a way that a proportionate quantity of lubricant is forced into the anti friction bearing by the outward movement of a piston carried in a cylinder. On the return movement of the piston the redundant portion of the lubricant is sucked back out of the anti friction bearing into the cylinder. This device is intended in particular for the relubrication of bearings which have been used and which are placed back into operation immediately after relubrication. The device is not, however, suitable for removing an excess quantity of lubricant from an anti friction bearing that had been previously pre-filled with lubricant, packaged and stored until use. For this situation the lubricant must be provided in excess since it serves also to seal the bearing against contamination and the entry of liquids such as water and moisture during its storage period and before it is put into use. The device as shown in the aforementioned German patent publication is furthermore not altogether suitable for the relubrication of bearings which are themselves subjected to high quantities of contaminants since during the relubrication process there is a high risk that the impurities already contaminating the bearing may be sucked off with the excess volume of lubricant. The impure excess lubricant may then find its way into the succeeding bearings to be lubricated.

It is an object of the present invention to provide an apparatus for removing excess lubricant from anti friction bearings which overcomes the disadvantages and defects of the prior art.

It is a further object of the present invention to provide an apparatus for removing excess lubricant from anti friction bearing which is simple and reliable and which may be employed not only with newly lubricated anti friction bearings but also with bearings which are to be relubricated.

It is another object of the present invention to provide an apparatus for removing the excess lubrication from anti friction bearings in which the risk of transferring contaminated lubricant from one bearing to another is avoided.

It is still another object of the present invention to provide an apparatus for removing excess lubricant to a degree and under controlled conditions which provide an optimum removal and a remainder of an optimum amount of lubricant within the bearing.

It is another object of the present invention to provide apparatus for the removal of excess lubricant from anti friction bearings which may be used with a wide variety of such bearings with equal effectiveness.

The foregoing objects, other objects, and numerous advantages of the present invention will be apparent from the following disclosure of the invention and a preferred form for carrying it out.

SUMMARY OF THE INVENTION

According to the present invention the apparatus for removing excess lubricant from an anti friction bearing having an outer race member, an inner race member, a plurality of roller bodies located therebetween and a lubricant supplied to the space between the race members comprises means for locating one end of the bearing in a sealed chamber and impressing a gaseous media into the chamber causing the media to flow axially through the anti friction bearing from one end to the other forcing the lubricant out of the other end. The apparatus also includes means for controlling the flow of gaseous media to regulate the amount of lubricant thus removed.

Further, according to the present invention the apparatus comprises a housing having a hollow chamber. The anti friction bearing may be mounted in the housing with one end in communication with the chamber and its other end extending outwardly therefrom. The chamber is sealed and is provided with means for impressing a pressurized gaseous media therein to cause a flow of the media axially through the bearing. The housing is divided into two chambers, the second chamber surrounding the outer end of the bearing so as to receive the removed lubricant. This second chamber may be formed of a portion of the housing which is removed from the other so that when filled the lubricant may be easily removed.

The apparatus is further provided with means for removably securing the bearing in a wall of the housing which means is itself removable from the housing and thus capable of being replaced with similar mounts which conform to the shape of the particular anti friction bearing being treated. Further, the housing is provided with a hinged and pivotable lid and valve means for controlling the flow of gaseous media. Means interconnect the lid and the valve so that the valve is operable upon opening and closing of the lid to provide the pressurized media only when the lid is closed. In a preferred form of the apparatus, the lid is provided with a locking member which forms the interconnecting means between the lid and the valve so that the pressurized media is supplied only when the lid is locked.

Full details of the present invention are set forth in the following disclosure of a preferred form and is shown in the accompanying drawings.

DESCRIPTION OF THE INVENTION

Figure 1:
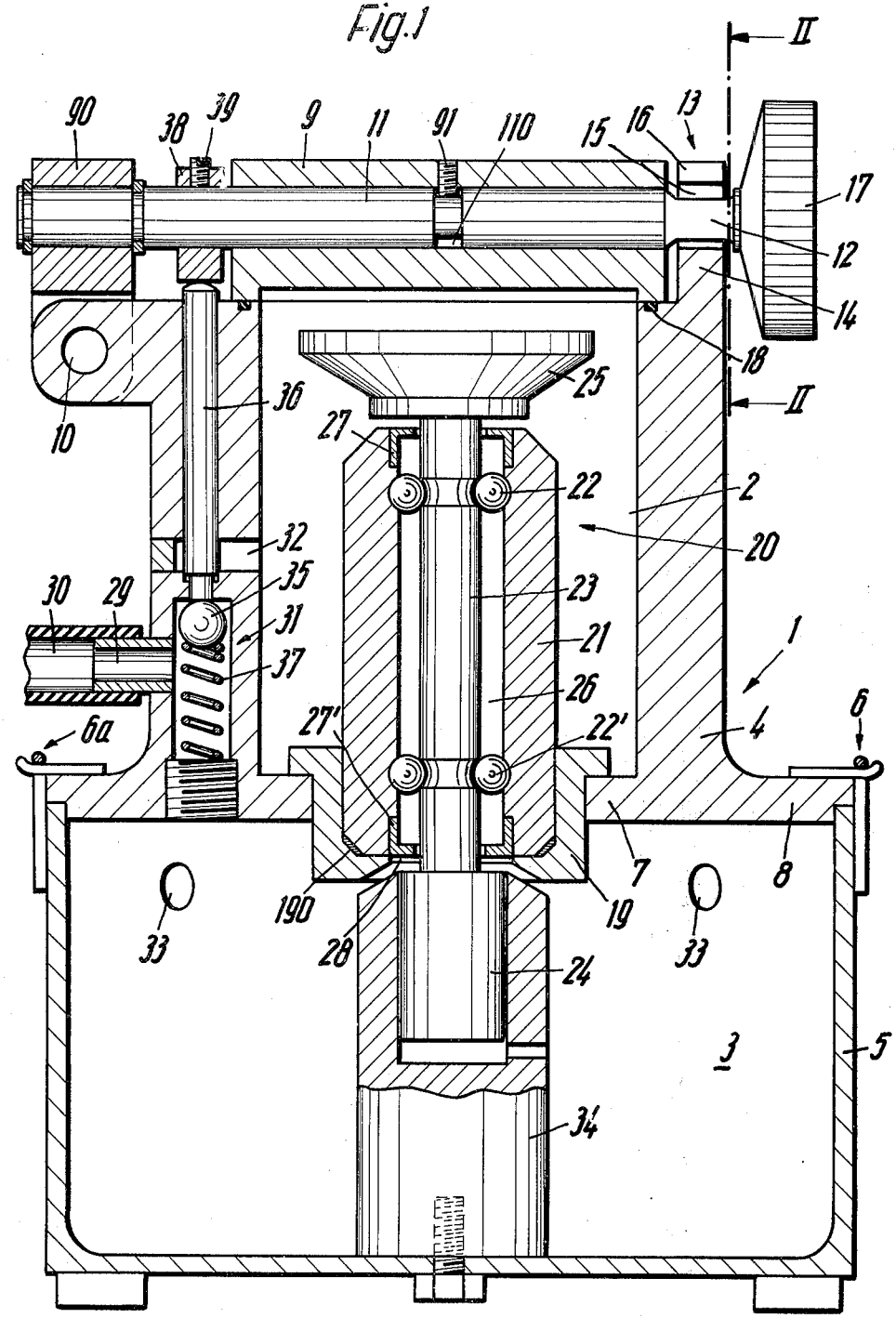
FIG. 1 is a side elevational view in section of the apparatus for removing excess lubricant from anti friction bearings according to the present invention.

For illustration only the following description and the drawings show the removal of lubricant from an anti friction bearing of a special type namely from a spinning turbine, generally depicted by the numeral 20, used in an open end spinning machine, in which the turbine is employed to twist fibers into a thread. The spinning turbine assembly comprises a cylindrical housing 21 which is shown in the drawing in a simplified form. The housing 21 forms the outer race and holds within it two parallel rows of anti friction roller bearing bodies 22 and 22' surrounding an axial spindle 23 which forms the inner race. The spindle 23 carried at one end a whorl 24 and at its other end the turbine 25. An annular axial space 26 is provided between the outer housing 21 and the spindle 23 which has been provided with a lubricant, such as grease or the like inserted by means of the conventional lubricating press to its complete volumetric capacity, thus containing an excess of lubricant. The axial ends of the bearing gap or space 26 is provided with packing or seal rings 27 and 27'. The packing acts to contain the lubricant within the space 26 and to prevent under normal conditions entry of contaminants.

Other forms of the spindle assembly 20 can be provided. For example, instead of the direct engagement of the roller bodies 22 with the housing and the shaft the spindle can be provided with inner and outer bearing rings respectively connected to the shaft and the housing. It will also be obvious that instead of a turbine assembly a more conventional bearing assembly comprising the inner and outer race members and the ball bodies, used in other industrial applications can be substituted for the illustrated bearing. In every case the roller bearing includes an axial annular space 26 between the inner and outer race members which can be filled by lubricant.

As seen in FIG. 1 for the anti friction bearing, generally referred to by the numeral 20, a housing is provided generally depicted by the numeral 1, which is itself divided into two hollow chambers 2 and 3. The housing is preferably formed in two parts namely an upper housing portion 4 and a lower housing portion 5 which are removably connected together by at least two pair of cooperating fastening means comprising bolts 6 and counter-bolts 6a. The bottom wall 7 of the upper housing portion 4 forms the dividing wall between the chambers 2 and 3 and is adapted to secure the anti friction bearing 20 in place. The bottom wall 7 has a flange-like marginal edge 8 to which the lower housing portion 4 is actually secured by the fastening means 6 and 6a.

The upper housing portion 4 is provided with a separate wall 9 which forms a covering lid. The lid 9 is hinged to pivot about a bearing bolt 10 connecting it with a side wall of the upper housing portion 4. The bolt 10 secures a bearing piece 90 in which a cylindrical shaft 11 is mounted so as to be axially fixed but rotatable about its longitudinal axis. The shaft 11 extends through the lid 9 with a slight degree of play allowing the shaft 11 to rotate relative to the lid. A set screw 91 is inserted through the lid 9 and engages in an annular groove 110 cut within the shaft 11. The cooperation of the screw 91 and the groove 110 insures the axial fixed position of the lid 9 on the shaft 11 without impeding the rotational mobility of the shaft 11. This mounting of the lid 9 is more advantageous than the conventional direct hinging of the lid 9 on the upper housing portion 4, since the bearing bolt 10 and the surfaces of contact between the lid 9 and the upper housing portion 4 do not have to be designed with great precision, especially of those parts which must run parallel to one another. In this construction the lid 9 through its eccentric swinging movement about the bolt 10 and with respect to the shaft 11, will be able to rest in firm and flat condition on the upper edges of the upper housing portion 4 under any condition.

Locking of the pivotal lid 9, in its closed position is effected by providing the shaft 11 with a flattened lug 12 at the end opposite the hinge 10 and having this lug engaged in and with a counter-bolt 13 which is formed in an upwardly projecting portion 14 of the upper housing portion 4. As seen in detail in FIG. 2 the counterbolt 13 is formed with a hasp 15 matched to the diameter of the shaft 11 and a slit 16 opening vertically upward. This space is matched to the flattened lug 12 which is itself formed by providing parallel land chordal surfaces while maintaining a transverse diametric portion intact. Thus the shaft 11 may be locked in the counterbolt 13 by sliding the landed portions through the slit 16 and then rotating the shaft 11 so that its diametric extending surface engages the sides of the hasp 15. Unlocking is effected by rotating the shaft 11 through 90° making it possible to pivot the lid 9 upward about its bearing 10, the flattened lug 12 passing through the slit 16. To effect manipulation of the shaft 11, the free end of the shaft 11 is provided with a knob or handle 17. An elastic seal ring or member 18 is seated in a shallow groove along the upper edge of the upper housing portion 4 so as to engage the lid 9 when it is closed thus insuring an airtight rigid closure between the lid 9 and the upper portion 4.

The anti friction bearing 20 is held in the bottom wall 7 of the upper housing portion 4 by a mount 19 which is formed like an annular bushing having an inner diameter forming a sleeve for receiving the bearing. At one end the mount 19 is provided with a radially outwardly directed flange adapted to rest on the wall 7 while at its other end it is provided with a radially inwardly directed flange adapted to permit one end of the bearing to seat thereon. The radially inwardly directed flange has an inner diameter sufficiently large to provide a bore 28 which allows access to the space 26 within the bearing 20.

The mount 19 is secured to the bottom wall 7 by press fit so as to be easily removable therefrom. Other types of easily removable fastening means can be employed. The removability of the mount permits the mount to be exchanged for differently shaped ones conforming exactly to the size and shape of the exterior of the anti friction bearing which is particularly being treated in the present apparatus. The mount 19 has an inner cross section which is designed and arranged so that it surrounds and grips the exterior of the anti friction bearing and holds it extremely close. A seal ring 190 is arranged between the anti friction bearing and the mount 19 so as to seal the two against the passage of air therebetween. Seal means may be provided also between the radially outwardly extending flange of the mount 9 and the inner wall 7 if desired. This however is generally not necessary since as will be seen the force of the air pressure within the chamber 2 will effectively cause the flange to seat on the wall 7 in sealed condition, particularly when coupled with the force fit of the mount 19.

In the foregoing manner the mount 19 fixes the anti friction bearing 20 within the housing so that one end of the space 26 enters into and is in communication with the chamber 2, which as seen is sealed by the lid 9 and the mount 19. The other axial end of the bearing extends into and is in communication with the chamber 3 which is preferably open to atmosphere. Preferably the anti friction bearing 20 is arranged so that the end into which the lubricant had been initially forced is in communication with the sealed chamber 2 while the end through which the lubricant exits is in communication with the unsealed chamber 3.

A pipe 30 leading from a source of a pressurized gaseous media such as compressed air, or a compression pump, is connected to a socket 29 mounted on the side wall of the upper housing portion 4. The socket 29 leads to a ball valve generally depicted by the numeral 31 which communicates with an aperture 32 entering into the interior of the sealed chamber 2. Compressed gaseous media such as air entering via the pipe 30 into the chamber 2 can only escape through the space 26 in the anti friction bearing since with the lid 9 in locked position and the mount 19 in place all exits from the chamber 2 are closed. The pressurized gas passes through the space 26 displacing the lubricant which had previously filled the space. The pressurized gas acts on the bearing and on the mount 19 to maintain these two in perfect position in the housing. As the air passes through the bearing 26 it exits through the enlarged bore 28 of the mount 19 into the chamber 3. The chamber 3 is provided with a plurality of holes 33 arranged about its circumference along its upper edge allowing the air to escape outwards into the atmosphere. The surplus lubricant carried by the air however is collected in the chamber 3 and does not pass out of the escape holes 33. The position of the holes 33 and the effective gravity on the lubricant insures that the excess lubricant is retained within the chamber 3. In order to protect the extending whorl 24 of the illustrated turbine, a protective casing or sleeve 34 is secured to the lower housing portion 5 so as to fit closely around the protruding whorl. The casing 34 is spaced from the mount 19 to allow the air and excess lubricant to pass. The flow of pressurized gas or air media into the chamber 2 is controlled and regulated by operation of the ball valve 31. The valve may be provided with a handle by means of which it may be manually opened and closed at will. It is however preferable and much simpler to provide for the operation of the ball valve as a function of the opening and closing of the lid 9 since a less complex operation is obtained and a more reliable trouble-free handling of the apparatus is ensured.

Figure 2:
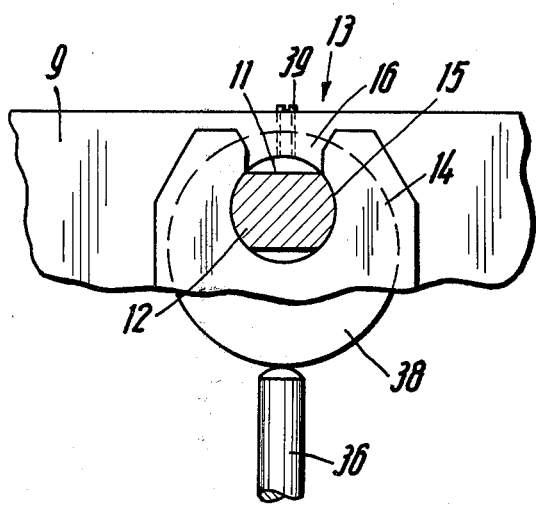
FIG. 2 is a view of a portion of the device taken in section along lines II-II of FIG. 1.

For the above purpose, the valve 31 comprises a ball 35 which is arranged in an enlarged cylindrical bore formed in a portion of the wall of the upper housing portion 4 and which is adapted to seat against the opening of a communicating passage between the socket 29 and the radial aperture 32. Associated with the ball 5 is an axially movable tappet pin 36 which extends in a vertical bore above the ball 35 having one end adapted to engage the ball and the other end extending outwardly of the upper edge of the housing portion 4 between the hinge block 90 and the lid 9. The ball 35 is normally biased against the tappet pin 36 and into seated engagement in the communicating passage by a spring 37 which is held in the oversized bore by a set screw. The spring 37 causes the ball 35 to urge the tappet pin 36 against the face of a circular cam disc 38 which is eccentrically attached to the locking shaft 11. The eccentrically mounted disc 38 is adjustably attached by means of a set screw 39 extending radially through the disc 38 into pressure engagement with the shaft 11. By rotating the disc 38 about the central axis of the shaft 11 the position of the tappet pin 36 and the ball 35 can be adjusted when the lid 9 is established in closed position. The provision of an eccentric cam disc 38 further insures that the tappet 36 and ball 35 can be operatively positioned not merely by opening or closing the lid but by rotation of the shaft 11 about which the disc 38 is fixed. The eccentric outer surface of the disc 38 is movable by rotation of the shaft 11 from an operative to an inoperative position. This should be of course arranged so that the operative position coincides with the condition wherein the shaft 11 is placed in fully locked position as indicated in FIG. 2 but when rotated 90° thereto the cam surface is placed in inoperative position. Thus whether the lid 9 is pivoted or not the ball 35 will not be placed in operative position unless the lock means 13 is in fully locked position. In this locked position the eccentric disc 38 should be placed in its adjustable position so that the tappet 36 and the ball 35 are moved against the force of the spring 37 so that the passage between the socket 29 and the aperture 38 is open thus placing the valve 31 in operative or open position. The degree to which the ball 35 is placed in open position can be obtained by adjustably mounting the disc 38 thereby the volume of fluid entering the chamber 2 can be adjusted and regulated. In any condition, unlocking the shaft 11 by rotation of the knob 17 and/or the lifting of the lid 9 will immediately close the ball 35 and render the valve 31 inoperative to pass the media into the chamber. This arrangement has a further advantage in that the valve 31 cannot be placed in open condition unless the shaft 11 is locked since even if the lid 9 were to be held down by some manual force the disc 38 would not be rotated in position to open the ball 35 unless this rotation were to place the shaft into locking engagement in the locking means 13. Thus the introduction of the pressurized media can only be effected when the lid 9 is locked. In operation, the anti friction bearing represented by the turbine 20 is inserted in its conforming mounting 19 which itself is then press fit into the wall 7 of the upper chamber 2. Thereupon the lid 9 is closed and the shaft 11 locked into firm position for a period of time allowing the pressurized gas media to enter into the chamber 2 and to force the lubricant from the space 26 into the lower chamber 3. The removal of excess quantities of lubricant from the anti friction bearing thus takes place in a simple, reliable, clean and rapid manner by merely closing and locking for a short time the lid 9. Manipulation of the source of air or of the anti friction bearing itself is not required. By providing several appropriate mountings 19, a large number of differently dimensioned and designed bearings or similar apparatus may be treated within the device of the present invention. In accordance with the method of the present invention the bearing is held so that only one end is maintained in a sealed chamber with the other end extending outwardly therefrom and the pressurized fluid is impressed serially or axially through the bearing under regulated control.

The surplus lubricant collected in the lower housing portion 5 can be removed easily and simply after detaching the portion 5 from the upper housing portion 4 merely by opening the lock bolts 6 and 6a. If desired the lubricant can be removed from the lower portion 5 and the portion replaced onto the housing. On the other hand, if desired several portions 5 may be provided so that the lubricant may be stored and transported without further handling.

The intensity of flow of the compressed air and its duration are preferably matched to the consistency of the lubricant and may be selected in such a way that only that quantity of lubricant that can be regarded as redundant and excess is removed and that a quantity sufficient for adequate lubrication be maintained in the bearing. The level of pressure in the compressed air and the time during which the valve 31 is maintained in open condition can be easily obtained by those skilled in this art without any experimentation.

Preferably the antifriction bearing 20 is mounted within the mount 19 so that the flow of air through the space 26 matches the direction in which the lubricant is initially fed into the space. This then insures that during any relubrication of the bearing, the remains of lubricant maintained within the bearing after the expulsion of the excess lubricant is removed by the insertion of the new and fresh lubricant into the bearing. In the event the air were allowed to flow in the opposite direction to that of the lubricant introduction, a risk would arise that the contaminated lubricant remaining on the edge of the space 26 between the race members, might find its way back into the bearing structure.

The source of compressed gas or air can comprise a flow generator such as a pump driven by hand or machine and if necessary it can be combined with the housing so as to form a single unit. On the other hand conventional line source of air under pressure can be used. It is further possible to employ a vacuum hooked to the lower housing portion 5 so that a partial vacuum is created therein sucking the lubricant out of the space 26.

It will be seen from the foregoing that the method and apparatus according to the present invention serves for the removal of lubricant filling the interior of an anti friction bearing to the level wherein the remainder is sufficient only for necessary and adequate lubrication of the bearing at high speeds. The further objects enumerated earlier in the introduction hereto have been clearly met by the method and the construction of the preferred apparatus.

Various modifications and changes may be made by those skilled in the art without departing from the concept of the present invention. The present disclosure is therefore intended to be illustrative of the invention only and not to be limiting of its scope.

What is claimed is:

1. Apparatus for removing excess lubricant from an antifriction bearing comprising a housing having an intermdiate wall dividing said housing into two hollow chambers, one of said chambers being sealed against opening to atmosphere and the other chamber forming a container for receipt of lubricant and being open to atmosphere, means for mounting an anti friction bearing in said intermediate housing wall said mounting means providing an opening to the one chamber open to the atmosphere and the other end extending outwardly therefrom into the sealed chamber, means mounted in the wall of the sealed chamber for impressing a gaseous media into said sealed chamber to cause a flow of gaseous media axially through an anti friction bearing mounted in the bearing mounting means and expel a lubricant into said chamber open to the atmosphere and said sealed chamber including valve means for manually controlling the amount of flow of a gaseous media into said sealed chamber.

2. The apparatus according to claim 1 wherein said means for mounting an anti friction bearing comprises a removable bushing secured in said intermediate wall.

3. The apparatus according to claim 2 wherein said bushing is provided with an inner bore conforming to the exterior shape of an anti friction bearing·to closely surround a bearing.

4. The apparatus according to claim 3 including seal means for preventing air from passing between a mounted bearing and the mounting supporting a bearing, said seal means being located between a supported anti friction bearing and said bushing.

5. The apparatus according to claim 1 wherein said housing is provided with a lid wall forming a portion of said sealed chamber and pivotally connected thereto, and includes means interconnecting said pivotal lid wall and said valve means whereby said valve means is closed when said lid wall is open and said valve means is open when said wall is closed.

6. The apparatus according to claim 5 wherein said interconnecting means is adjustable to regulate the flow of a gaseous media.

7. The apparatus according to claim 5 including lock means for securing said pivotal wall in closed condition, said valve interconnecting means being coupled to said lock means whereby said valve interconnecting means is closed when said lock means is open and said valve interconnecting means is open when said lock means is closed.

8. The apparatus according to claim 7 wherein said lock means comprises a rotatable shaft having a lug adapted to engage a fixed counter-bolt and said interconnecting means includes an adjustable disc cam eccentricly mounted about said shaft.

9. The apparatus according to claim 8 wherein said valve means comprises a socket and a ball resiliently biased to seat in said socket, and an elongated pin interposed between said ball and said disc cam acting on closing of said lock means to overcome said bias on a seated ball.

10. The apparatus according to claim 8 wherein said pivotal wall is mounted on said rotatable shaft and said shaft is hinged to said housing.

11. The apparatus according to claim 1 wherein said chambers are formed by separable portions of said housing, said separable portions being detachably fastened to each other.

12. The apparatus according to claim 11 wherein one of said housing portions is provided with a dividing wall between said chambers forming a closing wall for said sealed chamber.

13. The apparatus according to claim 12 wherein the housing portion forming the other chamber is provided with holes permitting the interior thereof to communicate with the atmosphere.

* * * * *